United States Patent
Huber

[11] 4,007,974
[45] Feb. 15, 1977

[54] SELF-PRESSURE PRODUCING SLIDING THRUST BEARING

[75] Inventor: Wolfgang Huber, Schweinfurt, Germany

[73] Assignee: SKF Industrial Trading and Development Company, B.V., Nieuwegein, Netherlands

[22] Filed: Feb. 2, 1976

[21] Appl. No.: 654,329

[30] Foreign Application Priority Data
Feb. 1, 1976 Germany .............. 2504204

[52] U.S. Cl. .............. 308/9; 308/122; 308/170; 308/DIG. 1
[51] Int. Cl.² .............. F16C 17/16
[58] Field of Search .......... 308/9, 107, 108, 122, 308/170, DIG. 1

[56] References Cited
UNITED STATES PATENTS

| | | | |
|---|---|---|---|
| 3,376,083 | 4/1968 | Muijderman | 308/9 |
| 3,517,973 | 6/1970 | Hirs | 308/9 |
| 3,764,186 | 10/1923 | Laing et al. | 308/9 |
| 3,870,382 | 3/1925 | Reinhoudt | 308/9 |

Primary Examiner—Robert R. Song
Assistant Examiner—Gene A. Church
Attorney, Agent, or Firm—Daniel M. Rosen

[57] ABSTRACT

A sliding thrust bearing has one bearing surface separated into a plurality of regions, each of which has a slot extending radially from the circumferential edge thereof. A plurality of grooves extends from each of the opposite sides of the slot, the grooves extending from opposite sides of the slot being inclined in opposite directions with respect to the circumferential direction of the bearing surface. A further bearing surface engages the grooved surface, whereby pressure of a lubricant builds up in the groove to one side of the slot for one direction of relative rotation of the bearing surfaces, and pressure of the lubricant builds up in a groove to the other side of the slot for the opposite direction of relative rotation of the bearing surfaces. The bearing surfaces may be flat or curved.

10 Claims, 6 Drawing Figures

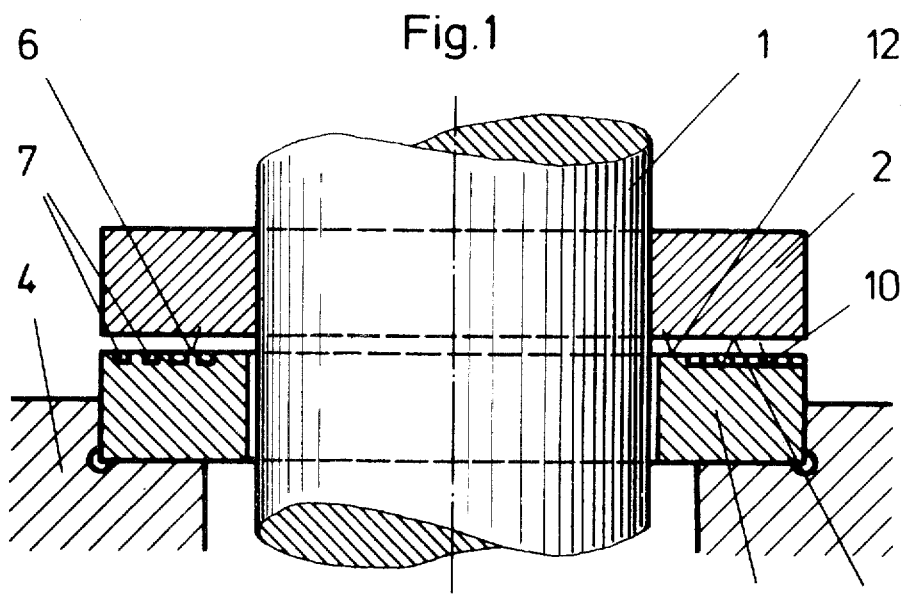
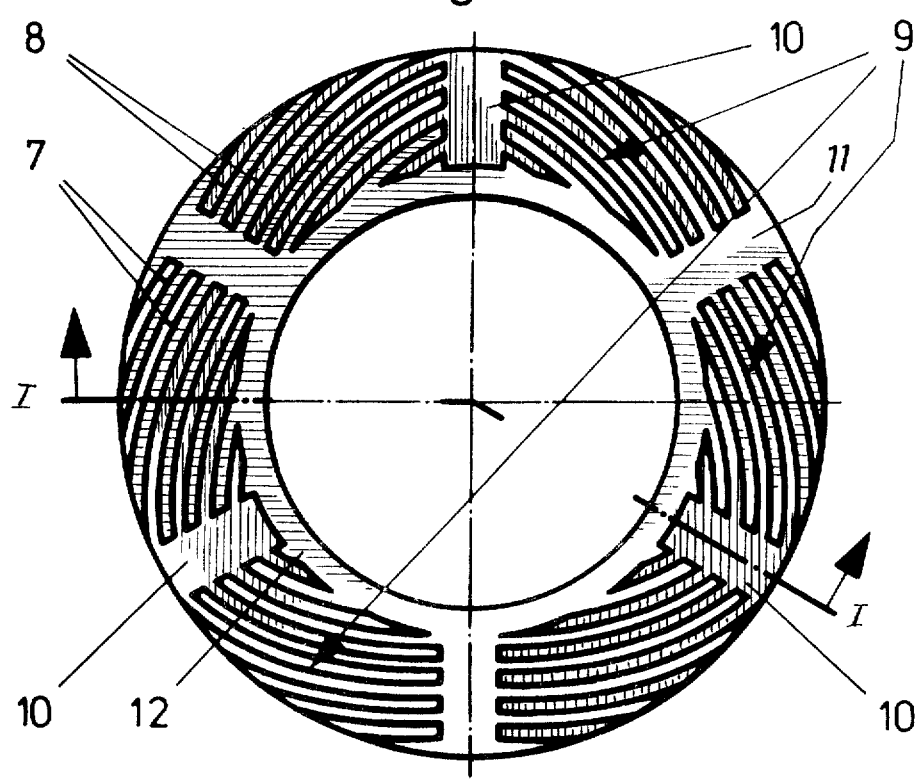

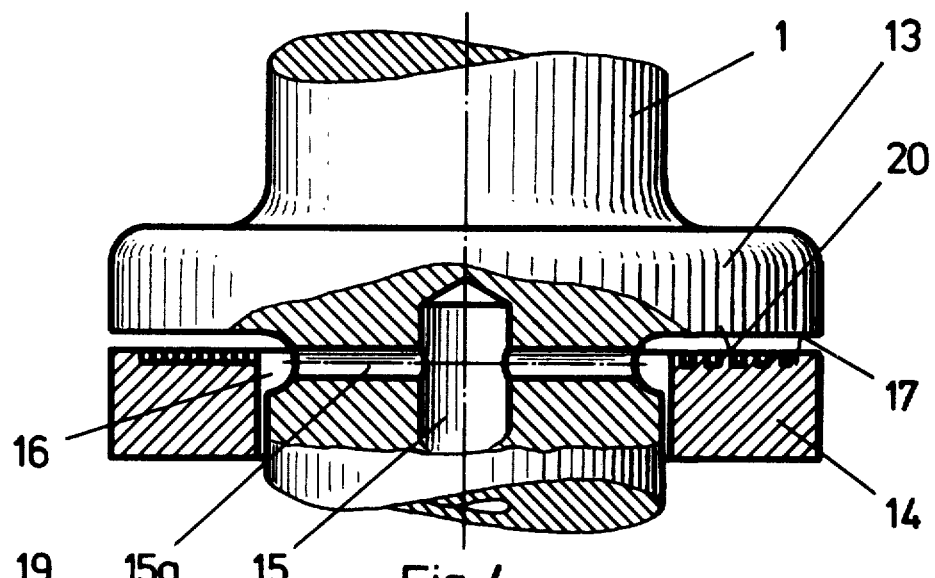
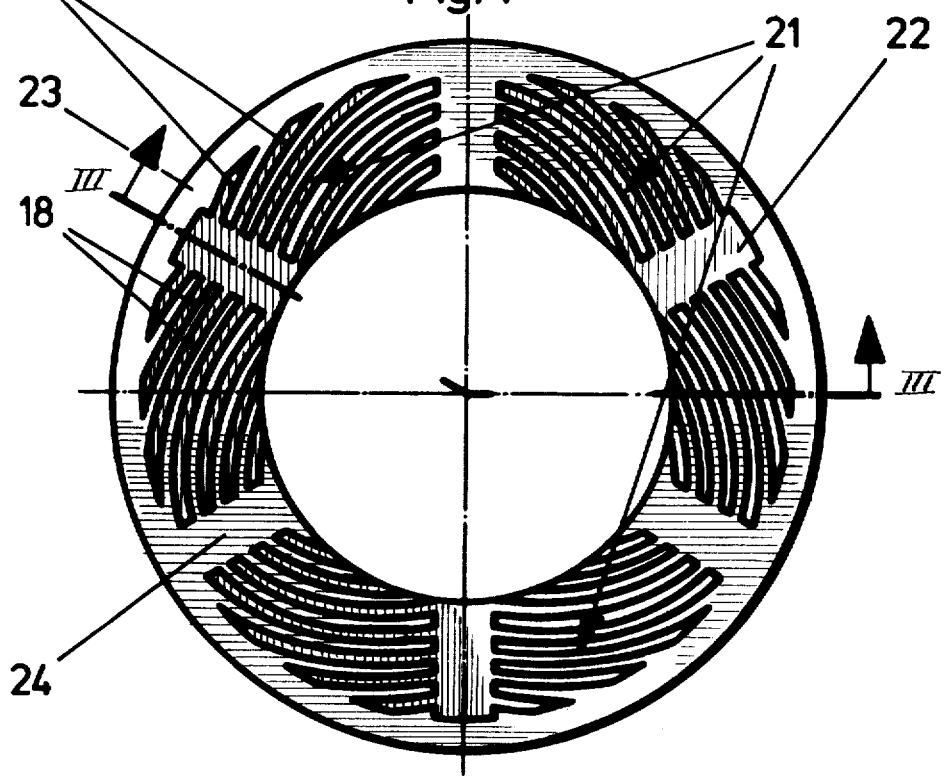

SELF-PRESSURE PRODUCING SLIDING THRUST BEARING

THE INVENTION

This invention relates to thrust bearings of the type having sliding bearing surfaces, and is more particularly directed to improvements in bearings of this type having grooves in one of the bearing surfaces, whereby the pressure of a lubricant is built up in the grooves upon relative rotation of the grooved surface and a sliding bearing surface engaging the grooved surface. The invention is concerned with a bearing of this type wherein the pressure of the lubricant is automatically built up in response to both directions of relative rotation of the bearing surfaces. In bearings of this type, the lubricating grooves are inclined to the circumferential direction of the bearing surface, and are open at one end to a supply of a lubricant.

German patent publication No. 1,525,190 discloses a self-pressure producing thrust slide bearing of the above type, having two concentric groups of grooves, each of which is arranged to produce a hydrodynamic load-bearing lubricant film between the sliding surfaces for a separate relative turning direction of the bearing surfaces. The arrangement disclosed in this patent publication has the disadvantage that a relatively large space in the radial direction of the bearing is required. Moreover, the sliding thrust bearing of this patent publication has bored channels distributed about its circumference, and the lubricant flows between the two concentrically arranged groups of grooves through these channels. The production of these bored channels is difficult and costly.

The present invention is therefore directed to the provision an improved self-pressure producing sliding thrust bearing, adapted for both turning directions of a shaft, wherein the bearing requires a minimum of space, and may be produced easily and economically.

Briefly stated, in accordance with the invention, the surface of the bearing that has lubricant grooves therein, is divided into a plurality of regions. Each region has a slot extending radially from a circumferential edge of the bearing surface. A plurality of grooves are provided extending from each side of the slot, the grooves on opposite sides of the slot being inclined in opposite directions with respect to the circumferential direction of the bearing surface. In this arrangement, upon relative rotation of the grooved surface and the smooth bearing surface engaging the grooved surface, the smooth surface acts upon the lubricant to effect a build-up of hydrodynamic or aerodynamic pressure in the grooves. Due to the opposite inclinations of the groups of grooves, the pressure is built up in only one group of grooves upon a given relative turning movement of the bearing surfaces. A small under pressure is produced in the other set of grooves, but this under pressure does not materially interfere with the hydrodynamic or aerodynamic load-carrying capacity of the thrust bearing.

According to one arrangement in accordance with the invention, the separate regions of the grooved bearing surface are separated by restrictions or lands. As a result, the hydrodynamic or aerodynamic pressure of the lubricant builds up against these lands, to advantageously result in an increase in the load-bearing capacity of the bearing.

According to a further feature of the invention, an annular or circular restriction or land is provided in the grooved bearing surface, at the ends of the grooves opposite their open ends, i.e., opposite the circumferential edge of the bearing surface at which the grooves are open. This annular or circular land also results advantageously in the increase of the load-bearing capacity of the bearing.

The lubricant grooves may be open at their radially outer ends, so that they are open either at the radially extending slot, or in the radially outer lubricant supply region at the outer circumference of the bearing. Alternatively, the lubricating grooves may be open at the radially inner ends, in which case they are open either at the respective radially extending slot or to a radially inner lubricant storage space. In an embodiment of the invention employing this latter construction, a shaft connected to one of the bearing surfaces has an axial bore communicating with a lubricant supply, the shaft extending through the center of the other bearing surface. The shaft is further provided with radially extending holes communicating with the central bore, to direct lubricant to the slots and grooves in the grooved bearing surface.

According to a further feature in accordance with the invention, the lubricating grooves are spiral shaped, so that a hydrodynamic or aerodynamic pumping action is produced in the grooves. This arrangement advantageously also increases the load-bearing capacity of the bearing.

In order that the invention will be more clearly understood, it will now be disclosed in greater detail with reference to the accompanying drawings, wherein:

FIG. 1 is a cross-sectional view of a sliding thrust bearing in accordance with one embodiment of the invention, taken along the lines 1—1 of the bearing surface illustrated in FIG 2;

FIG. 2 is a plan view of the grooved bearing surface of the sliding thrust bearing of FIG. 1;

FIG. 3 is a partially cross-sectional view of a sliding thrust bearing in according with a second embodiment of the invention, the cross-sectional portions of this view being taken along the lines III—III of FIG. 4;

FIG. 4 is a plan view of the grooved bearing surface of the bearing of FIG. 3;

Figure 5:
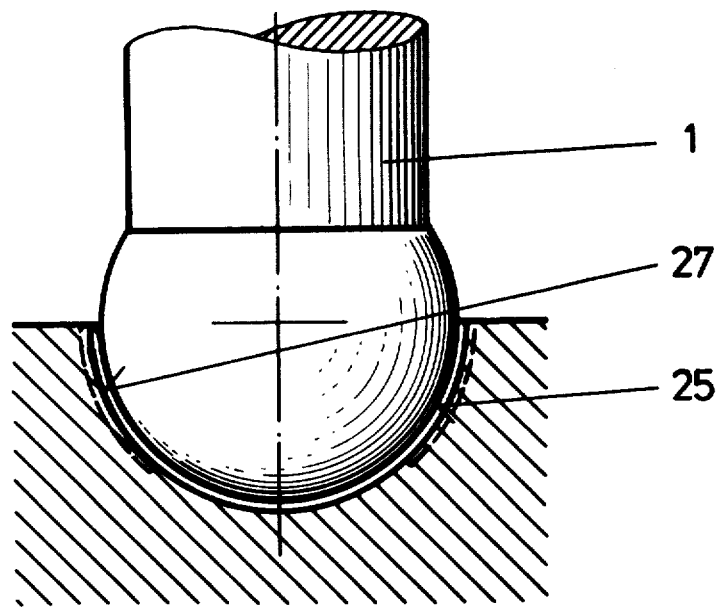
FIG. 5 is a partially cross-sectional view of a sliding thrust bearing in accordance with a third embodiment of the invention.

In FIGS. 1 and 3 the upper bearing rings 2 and 13, respectively, are shown axially displaced from the respective lower bearing rings 5 and 14. This spacing is provided only for the purpose of clarifying the understanding of the invention, and it will be apparent that in use the respective bearing surfaces are in engagement, separated only by a lubricant film.

Referring now to the drawings, and more in particular to FIGS. 1 and 2, a sliding thrust bearing in accordance with one embodiment of the invention includes a rotatable shaft 1. An upper ring 2 of the bearing is affixed to the shaft by any conventional means. The ring 2 has a flat lower slide bearing surface 3, the surface 3 being in a plane normal to the axis of rotation of the shaft. The surface 3 has no grooves. The lower bearing ring 5 of the bearing is fixedly mounted in a housing 4, and this ring 5 has an upper flat slide bearing surface 6 facing and aligned with the bearing surface 3.

The bearing surface 6 is provided with spiral-shaped grooves 7, 8 formed in the bearing surface. A lubricant, such as oil, is provided between these surfaces 3 and 6, so that these surfaces act together hydrodynamically in a manner that will be discussed in greater detail in the following paragraphs.

For the purposes of description of the bearing, the bearing surface 6 is separated into three surface regions 9, each of which has a set of grooves 7 and a set of grooves 8. The regions are circumferentially spaced apart, and each has a generally central radially extending slot 10 formed therein. The radially outer ends of the slots 10 extend to the outer circumference of the bearing surface. A lubricant is supplied to this outer circumference of the bearing surface by any conventional means, so that a lubricant can enter the open outer ends of the slots 10.

The radially inner ends of the slots 10 are closed in the vicinity of the inner edge of the bearing surface 6, i.e., the slots 10 do not extend completely radially across the bearing surface.

EAch region 9 of the surface 6 has spiral-shaped grooves 7, 8 extending inwardly on the bearing surface from opposite sides of the slots 10. In other words, a set of grooves 7 spirals inwardly from one side of each slot 10, and a set of grooves 8 spirals inwardly of the bearing surface from the opposite side of the slot 10. It will further be noted that the radially outer slots of the groups of slots 7 and 8 extend to the circumferentially outer edge of the bearing surface, rather than to the slot 10. As a consequence, the radially outer ends of the grooves 7, 8 are open, and terminate either in the respective slot 10, or in the outer circumferential edge of the bearing surface. The grooves 7, 8, depending upon the radial location on the surface 6, may thus receive lubricant either from the respective slot 10, or from the lubricant storage space in the vicinity of the outer circumferential edge of the bearing surface 6.

The regions 9 are circumferentially separated by radially extending unslotted restrictions or lands 11. The radially inner ends of the grooves 7, 8 are closed, and they terminate either in the vicinity of the inner edge of the surface 6, or at the edge of the lands 11. An annular restriction or land 12 is provided at the inner circumferential edge of the bearing surface 6, and the radially inner ends of the grooves 7, 8, which extend to the vicinity of the inner circumferential edge of the surface 6, thus terminate at the annular land 12.

In the arrangement of the invention illustrated in FIG. 1, the shaft 1 extends through the central bore of the bearing surface 6. It will, of course, be apparent that this feature does not form a part of the present invention, and that other arrangements may be provided.

In the arrangement of FIGS. 1 and 2, if the shaft 1 turns clockwise with respect to the ring 2, a lubricant, such as oil, is forced from the lubricant storage space and the slots 10 in the grooves 7, so that the hydrodynamic pressure of the lubricant goes up in these grooves. This pressure build-up results in the production of a load-bearing lubricant film between the bearing surfaces 3 and 6. A small under pressure is produced in the grooves 8, which spiral in the opposite direction. This under pressure does not materially affect the load-bearing capacity of the bearing, but the under pressure cannot be lower than the vapor pressure of the lubricant.

If the shaft is turned in the opposite direction relative to the ring 5, the lubricant is forced inwardly in the grooves 8 either from the outer circumference of the bearing surface or from the communicating slots 10. As a result, the pressure builds up in the grooves 8, and results in a load-bearing hydrodynamic lubricant film between the bearing surfaces 3 and 6. In this case, a slight under pressure of the lubricant is produced in the grooves 7.

FIGS. 3 and 4 illustrate a modification of the sliding thrust bearing in accordance with the invention, wherein a flange 13 is provided on the shaft 1, and the flange 13 is supported axially by a support plate 14. The shaft 1 has a central axially extending duct 15 which, at its upper end, communicates with radially extending holes 15a. The radially outer ends of the holes 15a communicate with an annular groove 16 in the shaft 1, immediately below the flange 13. The lower end of the bore 15 communicates with a suitable supply (not shown) of lubricant.

The flange 13 has a flat lower slide bearing surface 17 that is not provided with grooves. The support plate 14 has an upper slide surface 20 aligned with and slidably engaging the surface 17. The slide surface 20 is provided with spiral grooves 18, 19 inclined in opposite directions with respect to the circumferential direction of the bearing surface.

In order to clarify the structure of this embodiment of the invention, the bearing surface 20 is separated into circumferentially spaced apart regions 21. Each of these regions has a radially extending slot 22. The slots 22 are open at the circumferentially inner edge of the bearing surface to the annular groove 16 of shaft 1, whereby a lubricant such as oil from the lubricant supply may flow through the bore 15, thence through the holes 15a and the groove 16 to the slots 22. The radially outer ends of the slots 22 are closed in the vicinity of the outer circumferential edge of the bearing surface 20.

Spiral-shaped grooves 18, 19 are provided in each of the regions 21, with the grooves 18 extending from one side of the respective slot 22 and the grooves 19 extending from the other side of the respective slot 22. The grooves 18, 19, in each region of the bearing surface, incline in the opposite directions with respect to the circumferential direction of the bearing surface. The inner ends of the grooves 18, 19 are open, and extend to the slot 22 or the lubricant-supplying annular groove 16. The outer ends of these grooves are closed, and terminate either on the rim of the land surface 23 or on the rim of the land surface 24 of the bearing surface. The land surfaces 24 are radially extending, and separate the respective regions 21, while the land surface 23 is annular, and provided at the outer circumferential edge of the bearing surface.

The bearing of FIGS. 3 and 4 operates in a manner analogous to the arrangement of FIGS. 1 and 2. Thus, when the shaft turns clockwise with respect to the ring 14, the lubricant, such as oil, is forced away from the annular channel 16 or slots 22 into the grooves 19, so that a load-bearing hydrodynamic lubricant film builds up between the bearing surfaces 17 and 20. When the shaft 1 turns in the opposite direction with respect to the ring 14, the lubricant is forced into the grooves 18, so that a hydrodynamic load-bearing film is again built up between the two slide bearing surfaces 17 and 20.

Figure 6:
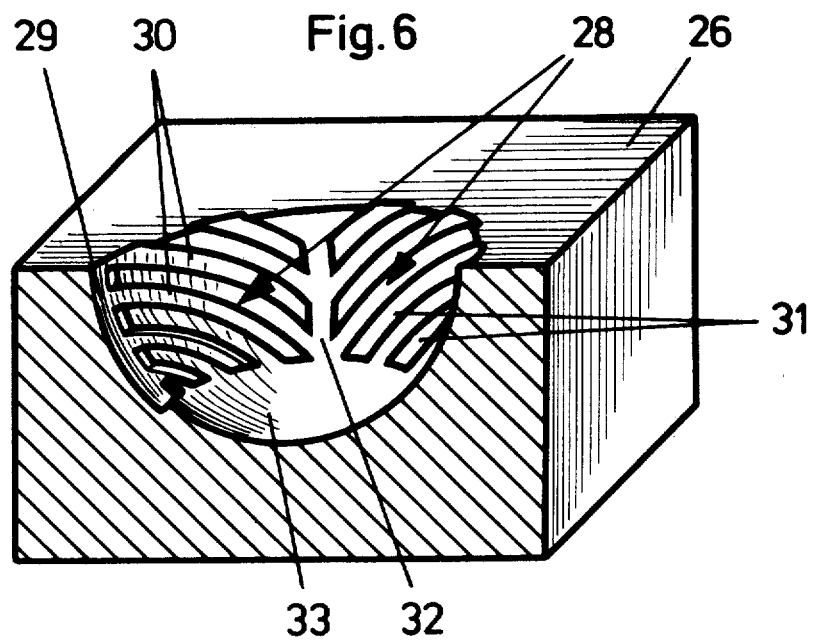
FIG. 6 is a perspective partially cross-sectional view of the lower grooved sliding surface of the sliding thrust bearing of FIG. 5.

In the arrangement of the invention illustrated in FIGS. 5 and 6, a smooth spherical end 25 is provided on a shaft 1, and a cup member 26 is provided with a corresponding spherically concave bearing surface 27. In a manner analogous to the arrangement of FIGS. 1 and 2, the bearing surface 27 is separated into surface regions 28 each having a radially extending slot 29. The slots 29 terminate, at their outer ends, in a lubricant supply (not shown) surrounding the bearing. The inner ends of the slots 29 are closed. Inwardly directed grooves 30, 31 in the surface 27 are provided extending from opposite sides of the groove 29, the grooves 30, 31 extending from the opposite sides of the slots and being inclined in opposite directions with respect to the circumferential direction of the bearing. The grooves 30, 31 are closed at their inner ends, and are open at their outer ends. The outer ends of the grooves 30, 31 terminate either in the respective slots 29, or in the lubricant supply surrounding the surface 27.

Restrictions or lands 22 are provided separating the regions 28 in the circumferential direction. In addition, the restriction or land 33 is provided at the center of the spherical concave land surface 27. In the arrangement of FIGS. 5 and 6, when the shaft 1 turns in a clockwise sense, the lubricant is forced from the circumference of the bearing in the inclined inwardly directed grooves 30, so that a load-bearing hydrodynamic lubricant film is built up between the bearing surfaces 25, 27. When the shaft 1 is turned in the opposite relative direction, the lubricant is forced into the other grooves 31 of the surface 27, so that again a load-bearing lubricant film is built up between the surfaces 25, 27.

While the invention has been disclosed and described with reference to a limited number of embodiments, it will be apparent that variations and modifications may be made therein. For example, it is apparent that the smooth bearing surfaces 3, 17 and 25 may be grooved in the manner above-described and illustrated, with the respective mating bearing surfaces 6, 20 and 27 being smooth. It is intended in the following claims to cover each such variation and modification as falls within the true spirit and scope of the invention.

What is claimed is:

1. In a sliding thrust bearing having a first sliding bearing surface with grooves open to a lubricant supply, the grooves being inclined to the circumferential direction of the bearing, and a second bearing surface in sliding engagement with said first bearing surface, whereby hydrodynamic or aerodynamic pressure builds up in said grooves upon relative rotation of said first and second bearing surfaces in both circumferential rotational directions, the improvement wherein said first bearing surface has a plurality of regions each of which has a slot extending radially from a circumferential edge of said first bearing surface, and wherein each region further has first and second groups of grooves extending from opposite sides of the respective slots, the grooves of said first and second groups being oppositely inclined with respect to the circumferential direction of the bearing surface, whereby pressure builds up in said grooves of said first group upon relative rotation of said first and second surfaces in one direction, and pressure builds up in said grooves of said second group upon relative rotation of said first and second surfaces in the opposite direction.

2. The sliding thrust bearing of claim 1, wherein lands are provided in said first bearing surface circumferentially separating said regions.

3. The sliding thrust bearing of claim 1, wherein an annular land is provided at the other circumferential edge of said first bearing surface, whereby at least some of said grooves are closed at one end by said land.

4. The sliding thrust bearing of claim 1, wherein a circular land is provided in said bearing surface opposite said circumferential edge, whereby at least some of said grooves are closed at said land.

5. The sliding thrust bearing of claim 1, wherein said grooves are open at their radially outer ends.

6. The sliding thrust bearing of claim 1, wherein said grooves are open at their radially inner ends.

7. The sliding thrust bearing of claim 1, wherein said grooves are spiral shaped.

8. The sliding thrust bearing of claim 1, wherein said first and second bearing surfaces are flat.

9. The sliding thrust bearing of claim 1, wherein said first and second bearing surfaces are curved.

10. The sliding thrust bearing of claim 9, wherein said first and second bearing surfaces are spherical surfaces.

* * * * *